(12) United States Patent
Otsuki (10) Patent No.: US 7,840,583 B2
(45) Date of Patent: Nov. 23, 2010

(54) SEARCH DEVICE AND RECORDING MEDIUM

(75) Inventor: Tetsuaki Otsuki, Suwa (JP)

(73) Assignee: Seiko Epson Corporation (JP)

( * ) Notice: Subject to any disclaimer, the term of this patent is extended or adjusted under 35 U.S.C. 154(b) by 423 days.

(21) Appl. No.: 12/079,432

(22) Filed: Mar. 26, 2008

(65) Prior Publication Data

US 2008/0243798 A1    Oct. 2, 2008

(30) Foreign Application Priority Data

Mar. 27, 2007    (JP) .............................. 2007-081691

(51) Int. Cl.
 G06F 7/00    (2006.01)
 G06F 12/00   (2006.01)
(52) U.S. Cl. ...................... 707/758; 707/822
(58) Field of Classification Search ................. 707/609, 707/705, 736, 758, 822; 717/143
 See application file for complete search history.

(56) References Cited

U.S. PATENT DOCUMENTS 6,802,059 B1 * 10/2004 Lyapustina et al. .......... 717/143
7,487,175 B2 * 2/2009 Yoshida et al. ................... 1/1
2004/0107223 A1 * 6/2004 Uno et al. .................... 707/200
2004/0172383 A1 * 9/2004 Yoshida et al. ................. 707/2
2005/0149579 A1 * 7/2005 Tsubaki et al. .............. 707/200
2006/0294135 A1 * 12/2006 Yoshida et al. ............. 707/102
2007/0250541 A1 * 10/2007 Takeda ....................... 707/200

OTHER PUBLICATIONS

"Lucene in Action", by Erik hatcher and Otis Gospodnetic; Manning Publications, ISBN 1-932394-28-1, 2005.

* cited by examiner

Primary Examiner—Hung T Vy
(74) Attorney, Agent, or Firm—Harness, Dickey & Pierce, P.L.C.

(57) ABSTRACT

A device composed of structures and access methods for providing search functionalities is proposed. The structure includes a presence/absence information unit that stores bit-level items grouped in blocks. Other structures included are, a character string list that is used to store keys composed of character strings and a file specification unit that uniquely identify files from multiple files. Each element of the 2 former structures has a uniquely assigned identification number. The presence/absence information items associated with each file are ordered according to the identification numbers stated previously. The elements of the former 2 structures are many-to-many associated through the presence/absence information items, using a combination of identification numbers. An obtaining unit for search keys is provided, together with the output unit that produces file identifiers specified by the file specification unit.

8 Claims, 8 Drawing Sheets

| WORD | and | big | black | cat | is | the |
|---|---|---|---|---|---|---|
| WORD IDENTIFICATION NUMBER | 5 | 4 | 6 | 2 | 3 | 1 |

FIG. 4

| m | 0x0000 | ... | 0x00.. | n | 0x00.. | ... | 0x00.. | ... |

FREQUENCY INFORMATION ITEM | $m$ LOCATION INFORMATION ITEMS | FREQUENCY INFORMATION ITEM | $n$ LOCATION INFORMATION ITEMS

FIG. 5

| WORD IDENTIFICATION NUMBER | 1 | 2 | 3 | 4 | 5 | 6 |
|---|---|---|---|---|---|---|
| PRESENCE/ABSENCE INFORMATION BLOCK (DOCUMENT FILE 1) | 1 | 1 | 1 | 1 | 1 | 1 |

| INPUT | 0<br>(00000000) | 1<br>(00000001) | 2<br>(00000010) | 3<br>(00000011) | ... | 254<br>(11111110) | 255<br>(11111111) |
|---|---|---|---|---|---|---|---|
| OUTPUT | 0 | 1 | 1 | 2 | ... | 7 | 8 |

SEARCH DEVICE AND RECORDING MEDIUM

The entire disclosures of Japanese Patent Application No. 2007-081691 filed on Mar. 27, 2007 is expressly incorporated by reference herein.

BACKGROUND

1. Technical Field

The present invention relates to a technique for searching information, particularly to one that is suitable for use in a so-called embedded system.

2. Related Art

Search engines are useful for conducting information searches for large amounts of data, such as those accessed over the internet. A search method using indices is well known as a technique for implementing a search engine. "Apache Lucene" is a practical example of utilizing such indices. These indices are usually designed so as to run suitably on a general-purpose system, such as a server or a personal computer, which includes a relatively large size of available resources (for example, refer to "Lucene in Action" by Erik Hatcher and Otis Gospodnetic, U.S.A., Manning Publications).

In recent years, there has been an increase in the number of small portable electronic devices that can be used to search for information, such as so called electronic-paper with memory retaining displays, mobile phones, etc. Further, increasing demands for information searches are expected not only from such portable electronic devices but also from devices in all fields, which have embedded systems specific to particular applications.

However, embedded systems often have specialized structures used exclusively for individual applications. They are often equipped with inferior computing ability and smaller memory capacity than general-purpose systems. Embedded systems therefore are no suited for processing such known search techniques as described above, which are often computationally and or memory intensive.

SUMMARY

The invention provides a technique capable of suitably executing an information search by using limited resources.

According to one aspect of the invention, a search device is comprised of the following: a storage unit storing a plurality of file information items that respectively identify a plurality of files, the plurality of files each including one or more character strings, a character string list that includes one or more character strings and one or more identification numbers, the one or more character strings being included in at least one of the plurality of files, and the one or more identification numbers respectively uniquely specifying the one or more character strings, and a presence/absence information list that includes presence/absence information blocks respectively for the plurality of files, the presence/absence information blocks each expressing one or more presence/absence information items which respectively indicate presence or absence of the one or more character strings included in the character string list, and the one or more presence/absence information items being arranged in an order dependent on the one or more identification numbers, and an obtaining unit that obtains a search character string as a search target to be searched for; an identification number specification unit that, when a character string including the search character string obtained by the obtaining unit is included in the character string list, specifies an identification number uniquely specifying the character string from the character string list; a file specification unit that specifies a file including the character string uniquely specified by the identification number specified by the identification number specification unit, in accordance with the one or more presence/absence information items in the presence/absence information list; and an output unit that outputs one of the plurality of file information items which indicates the file specified by the file specification unit.

In the search device configured as described above, presence or absence of each character string in each file is specified by use of only a single file; namely, the presence/absence information list. The search device is therefore capable of reading presence/absence information items at a high speed, and of reducing the data volume of the presence/absence information list.

The character string including a search character string is usually a word which has a particular meaning or function, but need not always be a word.

Alternatively in the search device configured as described above, the storage unit stores a plurality of location information items which respectively indicate locations of one or more character strings included in the at least one of the plurality of files, and the search device further comprises a location information specification unit that specifies a location information item indicating a location of the character string including the search character string in the file specified by the file specification unit, and the output unit outputs the file information item specifying the file specified by the file specification unit, and the location information item which is specified for the specified file by the location information specification unit. In this alternative configuration, not only a file including the search character string can be specified but also a location of a character string including the search character string within the file can be specified.

Also alternatively in the search device configured as described above, the storage unit stores a partition information item that divides the character string list into a plurality of parts, the identification number specification unit includes a partition specification unit that specifies which one of the plurality of parts divided by the partition information includes the character string including the search character string, which is obtained by the obtaining unit, and a determination unit that determines whether or not the one of the plurality of parts, which is specified by the partition specification unit, includes the character string including the search character string, and if the one of the plurality of parts, which is specified by the partition specification unit, includes the character string including the search character string, the identification number specification unit specifies an identification number uniquely specifying the character string. In this alternative configuration, whether or not a search character string is included need not be determined for the entered character string list. Accordingly, the processing speed can be increased. In addition, a required memory capacity can be reduced.

Also alternatively in the search device configured as described above, the identification number specification unit includes a search unit that searches, by a binary search, the character string list for a character string including the search character string obtained by the obtaining unit. In this alternative configuration, a character string including a search character string can be searched for without the necessity of searching the entire character string list in detail from the head of the character string list.

Also alternatively in the search device configured as described above, the one or more presence/absence information items respectively express presence or absence of the one or more character strings included in the character string list, so that the presence or absence of each of the one or more character strings is expressed by one bit. In this alternative configuration, presence or absence of each character string can be described by one bit. Accordingly, the data volume of the presence/absence information list can be further reduced.

Also alternatively in the search device configured as described above, the one or more identification numbers are assigned to the one or more character strings in an order starting from one or more character strings included in one of the plurality of files which includes a smallest number of character strings, and the smaller a total number of character strings which one of the files includes so as to appear at least one time in the one of the files is, the smaller a number of the presence/absence information items included in one of the presence/absence information blocks for the one of the file is. In this alternative configuration, the number of presence/absence information items included per presence/absence information block can vary between presence/absence information blocks. As a result, a storage capacity required for storing the presence/absence information blocks can be reduced.

Also alternatively in the search device configured as described above, the storage unit stores address information items which indicate the presence/absence of information blocks for the plurality of files, respectively, and the file specification unit specifies respectively individuals of the presence/absence information blocks based on the address information items, and specifies one of the plurality of files which includes the character string uniquely specified by the identification number specified by the identification number specification unit, from the presence/absence information blocks. In this alternative configuration, it is possible to singly specify the required presence/absence information block instead of iterating through the entire blocks. And, data indicating a boundary between presence/absence information blocks need not be inserted in the presence/absence information list.

According to another aspect of the invention, there is provided a computer readable medium storing a program causing a computer to execute a process comprising: obtaining a plurality of file information items that respectively identify a plurality of files, the plurality of files each including one or more character strings, a character string list that includes one or more character strings and one or more identification numbers, the one or more character strings being included in at least one of the plurality of files, and the one or more identification numbers respectively uniquely specifying the one or more character strings, a presence/absence information list that includes presence/absence information blocks respectively for the plurality of files, the presence/absence information blocks each expressing one or more presence/absence information items which respectively indicate presence or absence of the one or more character strings included in the character string list, and the one or more presence/absence information items being arranged in an order dependent on the one or more identification numbers, and a search character string as a search target to be searched for; specifying, when a character string including the obtained search character string is included in the character string list, an identification number uniquely specifying the character string from the character string list; specifying a file including the character string uniquely specified by the specified identification number, in accordance with the one or more presence/absence information items in the presence/absence information list; and outputting one of the plurality of file information items which indicates the specified file.

The invention thus allows the program as described above to be downloaded via a network and to be installed in various electronic devices so that the program performs a function as a search device. Otherwise, the program can be provided in a form of a recording medium on which the program is recorded.

BRIEF DESCRIPTION OF THE DRAWINGS

Embodiment of the invention will be described in detail based on the following figures wherein.

DETAILED DESCRIPTION

An embodiment of the invention will now be described with reference to the drawings.

For convenience of explanation, sentences and words are all written in the English language using Roman alphabet in the following description of the embodiment. However, the invention is applicable also to other languages, using characters other than Roman alphabet, such as the Japanese language. Numerals and symbols may be included in character strings, which may come from a standardized character set such as ASCII or other character sets such as utf8.

1. Configuration

Figure 1:
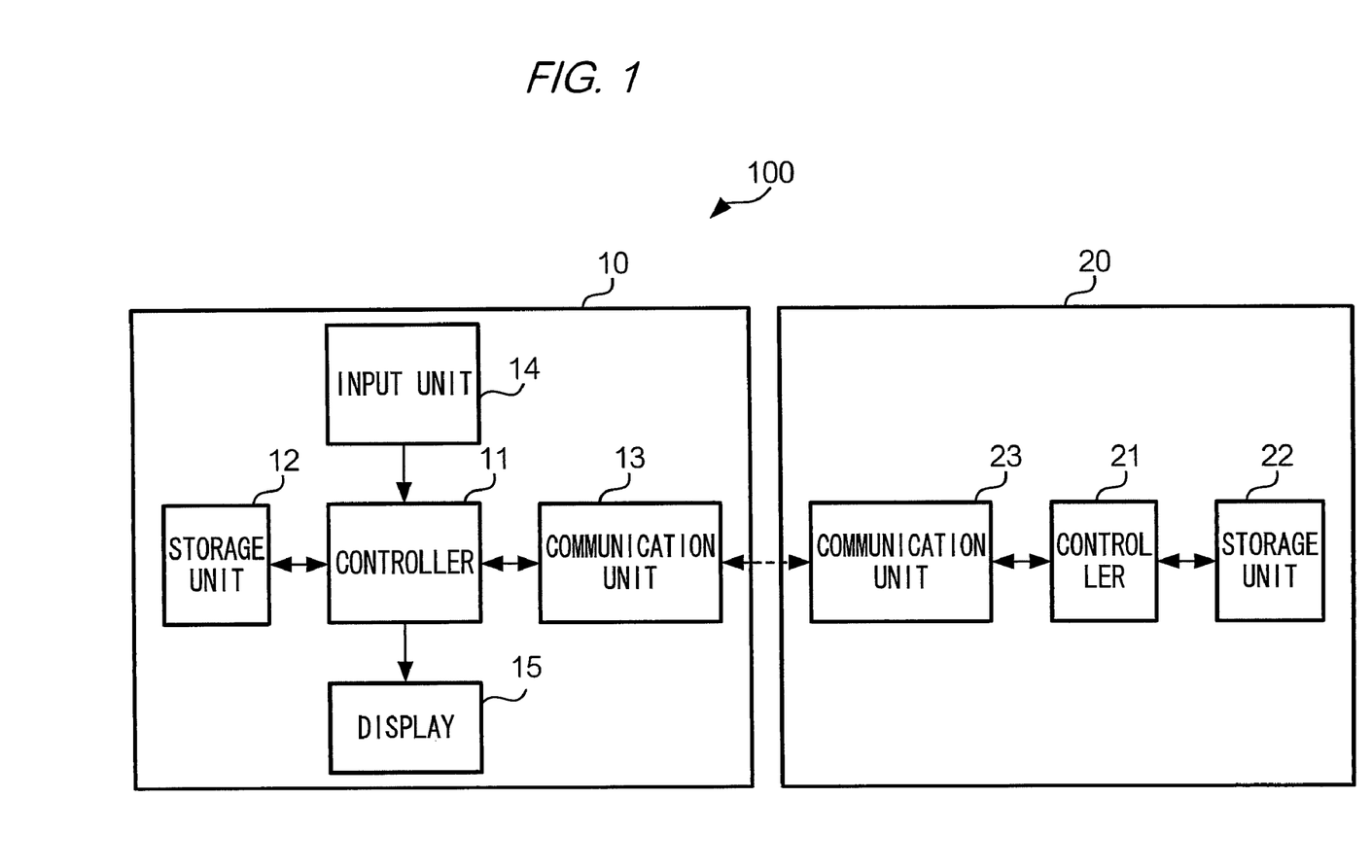
FIG. 1 is a block diagram showing an information processing system according to an embodiment of the invention.

FIG. 1 shows a block diagram illustrating a configuration of an information processing system 100 according to an embodiment of the invention. As shown in FIG. 1, the information processing system 100 includes a search device 10 and a data management device 20. The search device 10 is a portable display device, e.g., a so-called electronic paper in this embodiment. The data management device 20 is an information processing device such as a personal computer, which processes various data used by the search device 10 and supplies the search device 10 with various data as required.

The search device 10 includes a controller 11, a storage unit 12, a communication unit 13, an input unit 14, and a display 15. The controller 11 includes memories (a main memory and a buffer memory), which are used as work areas for a processor such as a CPU (Central Processing Unit). The controller 11 controls components of the search device 10. Also, the controller 11 executes programs stored in the memory unit 12 thereby to perform a search function, which will be described later.

The storage unit 12 stores various data used by the search device 10. The storage unit 12 includes a rewritable storage medium such as a flash memory. This storage medium may be configured to be attachable/detachable, like a so-called memory card. Data stored in the storage unit 12 includes programs executed by the controller 11, document files respectively describing documents and indices used for searching for character strings. Plural document files are stored in the storage unit 12, and are assigned file names which uniquely specify the document files, respectively. That is, the storage unit 12 stores the files identifiably. The document files each include plural extractable character strings. The indices are a collection of various data used for searches, and are generated and supplied by the data management device 20.

The communication unit 13 includes an interface through which data is transmitted/received to/from the data management device 20. The interface may be a wired interface based on a USB (Universal Serial Bus) standard or a wireless interface based on infrared communication.

The input unit 14 includes an interface which allows a user to input instructions. The instructions may include an instruction to specify a character string as a search target, an instruction to control a screen displayed on the display unit 15 (for example, to specify a document or a page or to scroll a screen), etc. Otherwise, the input unit 14 may include a key input device such as a keyboard, or a touch screen input device provided on a display screen of the display unit 15. In case of a touch screen input device, a specialized screen may show up on the display screen while a user is inputting a character string, or a handwritten trace drawn by touch of the user may be recognized. Alternatively, the user may use a pen-type tool (e.g., a so-called stylus pen or touch pen) to input instructions.

The display unit 15 displays a document described as a document file in accordance under the control of the controller 11. The display 15 has, for example, a display screen which is constituted of a matrix of pixels. The display screen is, for example, an image-retaining display which uses cholesteric liquid crystal. In this embodiment, the term "image-retaining display" refers to a display which is capable of retaining a display state (e.g., gradations) without application of electric power. By use of this display, electric power consumption is reduced except during rewriting of a display state.

The data management device 20 includes a controller 21, a storage unit 22, and a communication unit 23. The controller 21 has a processor and memories, and controls components of the data management device 20. The controller 21 performs calculation processing for generating or editing data which the search device 10 uses for searches. The storage unit 22 stores various data used by the data management device 20. The storage unit 22 stores programs executed by the controller 21, and data generated by the controller 21. The communication unit 23 is an interface compatible with the communication unit 13 of the search device 10, and transmits/receives data to/from the search device 10.

The data management device 20 is capable of deleting document files stored in the search device 10 or adding new document files to the search device 10.

2. Operation

The configuration of the information processing system 100 has been described above. In this configuration, the search device 10 has a display function to present documents, and a search function to search for words included in documents. The data management device 20 generates data which the search device 10 requires to perform the search function. The generated data are indices.

In the following description, how the data management device 20 operates to generate indices will be described first. Described second will be an operation of the search function which the search device 10 performs using the generated indices.

2-1. Generation of Indices

Figure 2:
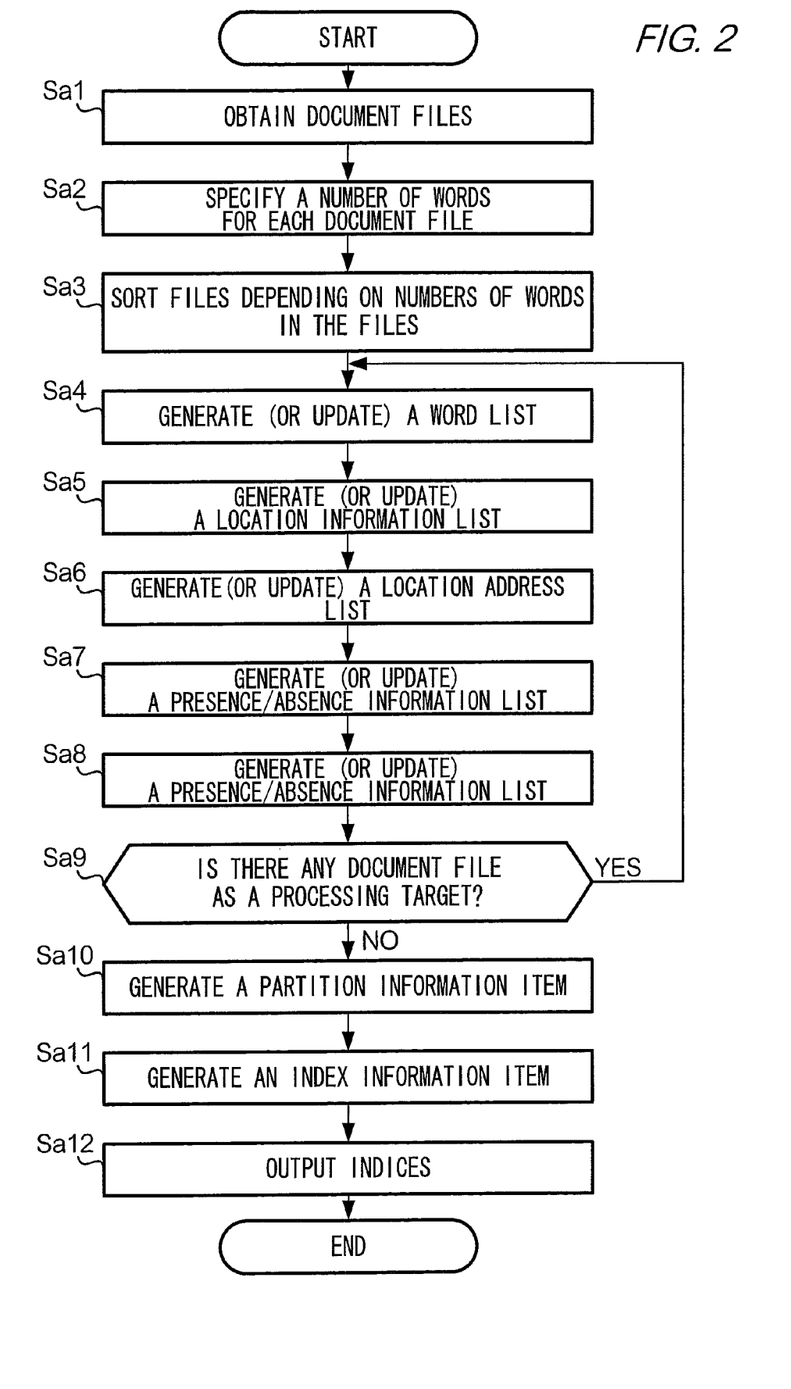
FIG. 2 is a flowchart showing an operation of a data management device.

FIG. 2 is a flowchart showing an operation of the data management device 20. In this example, the data management device 20 performs the operation when the search device 10 is connected, i.e., when communication is made available between the communication units 23 and 13. As shown in FIG. 2, the controller 21 of the data management device 20 firstly obtains all document files that are stored in the storage unit 12 of the search device 10 (step Sa1). At this time, the controller 21 also obtains information which specifies locations where the documents are respectively stored in the storage unit 12. In this embodiment, file paths are used as information which specifies locations. However, the locations may be specified only by file names if all the document files are stored in one single directory. Further, the controller 21 needs only to copy the document files from the storage unit 12 but need not move the document files from the storage unit 12.

Subsequently, the controller 21 extracts words from each of the document files, and specifies a number of words included in each of the document files (step Sa2). The term "word" refers to a character string which consists of plural characters and expresses a particular meaning or function. The term "number of words" refers to a total number of respectively different words, each of which appears at least one time in one document file, excluding a number of repetitive appearances of each word. The "number of words" is not a total count indicating how many words appear in one document. After specifying the number of words for each document file, the controller 21 sorts (or rearranges) the document files in an order dependent on the specified numbers of words (step Sa3). This is because the document files are sequentially dealt with as targets for a processing described below, one after another of the document files in an order from a document file which includes the smallest number of words. At this time, the controller 21 assigns unique identification numbers to the document files, respectively. The identification numbers will be hereinafter referred to as "file identification numbers". The smaller the number of words included in a document file is, the smaller the identification number assigned to the document file is.

Next, the controller 21 generates indices with reference to the document files. In this embodiment, indices each are a collection of data which are a "word list", a "location information list", a "location address list", a "partition information item", and an "index information item".

Based on a document file, the controller 21 generates a word list, a location information list, a location address list, a presence/absence information list, and a file information list.

The controller 21 updates these lists subsequently based on another document file. The controller 21 repeatedly updates the lists by dealing with different document files one after another as processing targets. Upon completion of processing of all the obtained document files, the controller 21 ends updating. Operations of the processing will now be described in detail below.

The controller 21 firstly generates a word list (step Sa4). The word list lists all words each of which appears at least one time in a document file. In the word list, the words each of which appears at least one time in the document file are arranged in an lexicographic order. At this time, the controller 21 assigns unique identification numbers to the words, respectively. These identification numbers will be hereinafter referred to as "word identification numbers". The word identification numbers may be of any type insofar as each word can be uniquely identified. In this embodiment, the word identification numbers are assigned in such a manner that the earlier a word is detected, the smaller a word identification number assigned to the word is.

The word list will now be described referring to a specific example. The example supposes a case of generating a word list from a particular document file (hereinafter a "document file F1") dealt with as a processing target. The document file F1 is assumed to include only a sentence "The cat is big and black", and words are extracted in order from the head of this sentence.

In this example, the controller 21 assigns numbers "1","2", "3", . . . respectively to the words "the", "cat", "is" . . . . As a result, the controller 21 generates a word list as shown in FIG. 3.

Figure 3:
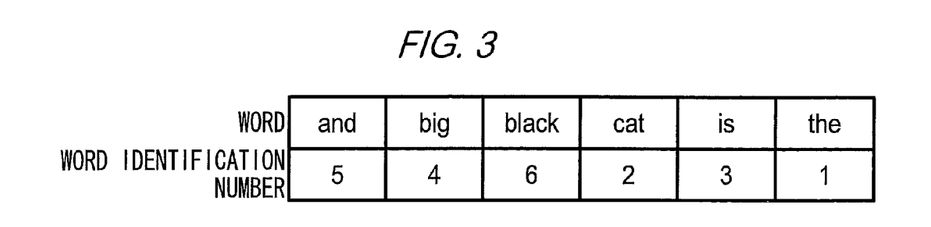
FIG. 3 shows an example of a word list.

In FIG. 3, words are arranged in an upper line of a table while word identification numbers are arranged in a lower line, in order to clearly explain correspondence between the words and the word identification numbers. In actual data, however, words and word identification numbers are not arranged in different lines but are arranged alternately in one sequence. That is, "the", "1", "cat", "2", and "is" "3" are described and stored in this order in the word list.

Next, the controller 21 generates a location information list (step Sa5). The location information list lists information items (hereinafter "location information items") indicating which words in a document file are respectively located at which locations in the document file. The location information list also includes information items (hereinafter "frequency information items") indicating frequencies at which the words included in the document file respectively appear in the document file. Location information items and frequency information items for one document file are collected together into one block, which will be hereinafter referred to as a "location information block". A collection of location information blocks further constitutes the location information list.

Figure 4:
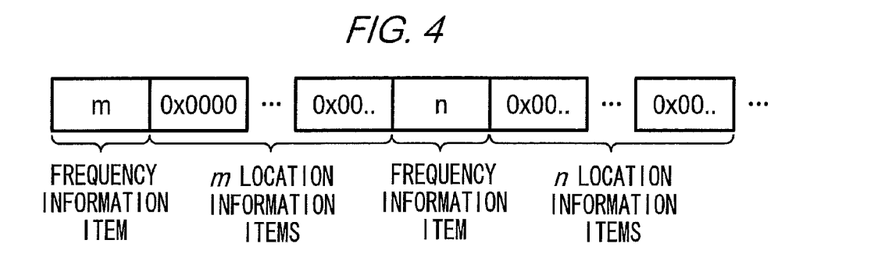
FIG. 4 shows an example of a data format of a location information block.

FIG. 4 shows an example of a data format of the location information block. As shown in the figure, the location information block is a collection of combinations, each of which consists of a frequency information item and one or more location information items corresponding in number to a frequency value indicated by the frequency information item. For example, if a word w1 appears m times in a document file, there are total m location information items for the word w1. If a word w2 appears n times, there are total n location information items for the word w2. The location information items may be of any type insofar as the location information items each can specify a location in a document file. For example, location information items each may indicate a number of characters or bytes counted from the head of a document, or may be a combination of a page number and coordinates in a document described by a document file.

In this manner, the controller 21 obtains frequency information items and location information items for all words included in a document file, and generates a location information block.

Next, the controller 21 generates a location address list (step Sa6). The location address list lists data sets which respectively describe relative locations (hereinafter "location addresses") of the frequency information items described in the location information list. Location addresses for one location information block are collected together into a block which will be referred to as a "location address block".

In each of the location information blocks and location address blocks, information items relating to words are arranged in an order according to word identification numbers. In this embodiment, in each of the location information blocks and location address blocks, data sets are arranged in an order from the smallest word identification number.

Next, the controller 21 generates a presence/absence information list (step Sa7). The presence/absence information list lists presence or absence of each of words included in the word list, for each of document files. In this embodiment, presence of a word in a document file is indicated as "1" while absence of a word from a document file is indicated as "0". The information indicated as "1" or "0" will be hereinafter referred to as a "presence/absence information item". Presence/absence information items for one document file are collected together into a block which will be referred to as a "presence/absence information block". In the presence/absence information block, presence/absence information items are described in the aforementioned order dependent on word identification numbers.

Figure 5:
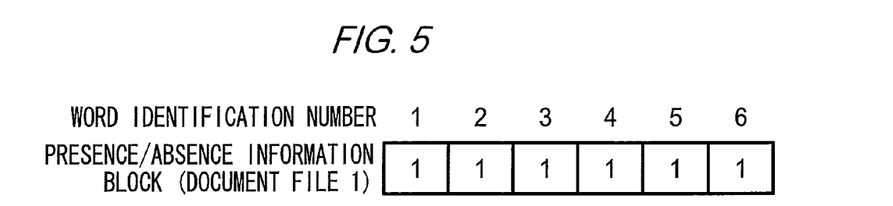
FIG. 5 shows an example of a presence/absence information block.

The presence/absence information block will now be described with reference to the same example as has been cited in the foregoing description concerning the word list. If the document file F1 is the only target from which the word list is generated, the word list is then as shown in FIG. 3 at this time. Values in the presence/absence information block generated at this time are all "1" as shown in FIG. 5. This is because, at the time when a presence/absence information list is generated for the first time, the word list includes only the words which are included in the document file F1.

Next, the controller 21 generates a file information list (step Sa8). The file information list is a collection of data sets each of which includes a file path and various addresses (relative locations in the list).

Figure 6:
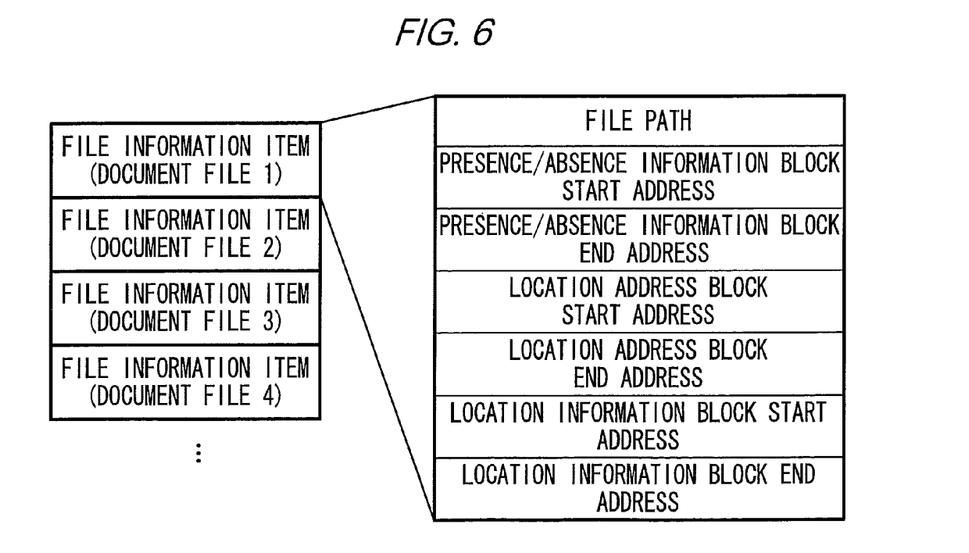
FIG. 6 shows an example of a data format of a file information list.

FIG. 6 shows an example of a data format of the file information list. As shown in the figure, the file information list describes a "file path", a "presence/absence information block start address", a "presence/absence block information end address", a "location address block start address", a "location information block end address", a "location information block start address", and a "location information block end address", for each document file. A collection of these items of data will be hereinafter referred to as a "file information item". File information items are described in an order dependent on file identification numbers. That is, the file information items are described respectively associated with file identification numbers, in the file information list.

The "file path" describes a file path of an associated document file. This file path is based on a file path obtained in the step Sa1.

The "presence/absence information block start address" and "presence/absence information block end address" define a range of a presence/absence information block for an associated document file in the presence/absence information list.

That is, the "presence/absence information block start address" describes an address of a first presence/absence information item in the presence/absence block for the associated document file. The "presence/absence information block end address" describes an address of a final presence/absence information item in the presence/absence block for the associated document file.

The "location address block start address" and "location address block end address" define a range of a location information block for an associated document file in the location information list. That is, the "location address block start address" describes a location address of a first frequency information item in the location address block for the associated document file. The "location address block end address" describes a location address of a final frequency information item in the location address block for the associated document file.

The "location information block start address" and "location information block end address" define a range of a location information block for an associated document file in the location information list. That is, the "location information block start address" describes a location address of the head of the location information block for the associated document file. The "location information block end address" describes a location address of the end of the location information block for the associated document file.

The "location address block start address" and the "location information block start address" are the same location address. However, the "location information block end address" and the "location information block end address" are different location addresses.

Figure 7:
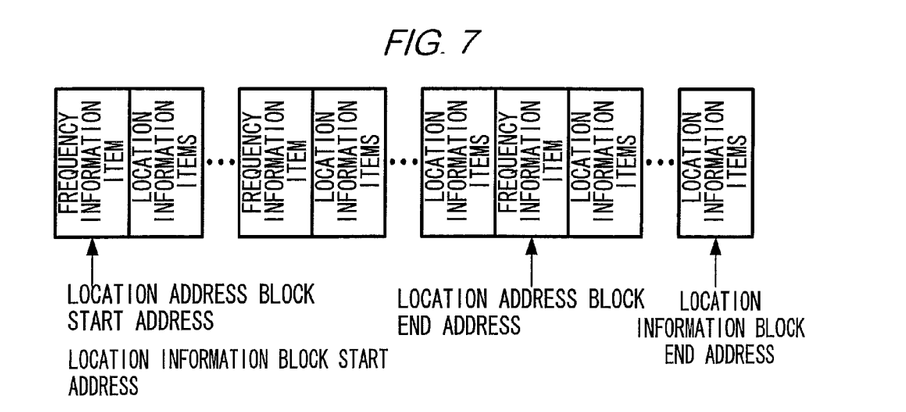
FIG. 7 shows an example of relationships between a location information block and location addresses.

FIG. 7 shows a relationship between a location information block and the location addresses mentioned above. The location information block is a collection of data combinations each of which consists of one frequency information item and one or plural location information items, as described previously. As shown in this figure, the "location information block end address" indicates a location address of a location information item at the end of the location information block. However, the "location address block end address" indicates a location address of the final frequency information item described in the location information block.

Upon completion of the processing of steps Sa4 to Sa8 on a document file, the controller 21 completes processing targeted on the document file. Further, the controller 21 determines whether or not there is any other document file to be processed as a processing target (step Sa9). The controller 21 makes this determination because the processing of steps Sa4 to Sa8 is to be finally carried out on all document files.

If there is any other document file as a processing target (step Sa9: YES), the controller 21 executes the same processing of steps Sa4 to Sa8 as described above on the document file. However, the location address list, location information list, word list, presence/absence information list, and file information list have already been generated before the execution of the processing of steps Sa4 to Sa8 is repeated the second or subsequent times. The controller 21 therefore does not generate these files but updates these lists. The flowchart of FIG. 2 will therefore be referred to again with terms derived from "generate" replaced with terms derived from "update", regarding the second or subsequent sessions of the processing. The foregoing description will also be referred to again in the same manner.

When updating the location information list, the controller 21 adds a new location information block to the end of the existing location information list which has already been generated. Between the existing and new location address blocks, the controller 21 may insert any data indicating a boundary between the existing and new location address blocks. The controller 21 updates the location information list and the file information list in a similar manner to a manner of generating these lists. That is, the location address block and the file information items are generated in an order from a document file which includes the smallest number of words.

When updating the word list, the controller 21 arranges words in an lexicographic order. That is, the controller 21 does not add new words to the end of the existing word list but performs a processing of inserting new words at appropriate positions according to lexicographic order.

The above update processing will now be described referring to a specific example. In the example, the existing word list is the same as that shown in FIG. 3. At this time, a "document file F2" includes only a sentence of "The dog is small and white". Words are extracted in order starting from the head of this sentence.

In this case, the controller 21 does not assign word identification numbers to words that have already been assigned word identification numbers. That is, in this example, new word identification numbers are assigned to neither "the" nor "is". As a result, the controller 21 assigns "7", "8", and "9" respectively to "dog", "small", and "white". The word "dog" comes after the word "cat" and before the word "is" in lexicographic order. Similarly, the word "small" comes after the word "is" and before the word "the" in lexicographic order. The word "white" comes after the word "the". Accordingly, the word list is updated as shown in FIG. 8 by the controller 21.

Figure 8:
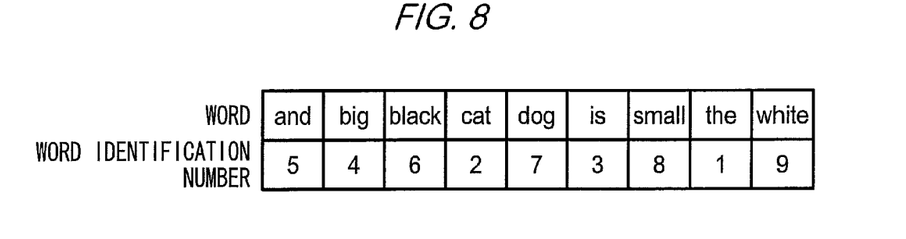
FIG. 8 shows an example of a word list.
Figure 9:
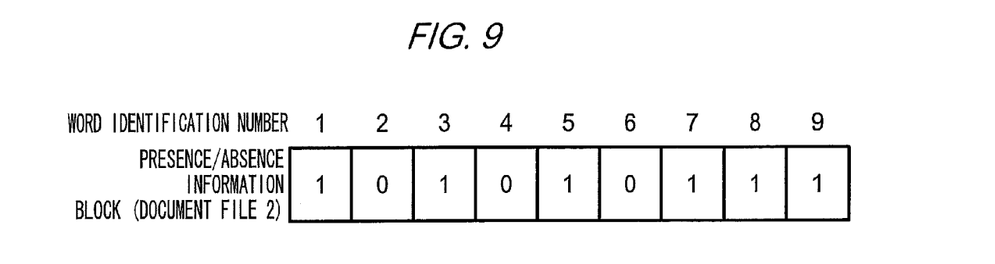
FIG. 9 shows an example of a presence/absence information block.

Subsequently, an operation of updating the presence/absence information list will be described with reference to the same example as shown in FIG. 8. The controller 21 generates a presence/absence information block as shown in FIG. 9, associated with the document file F2. As shown in FIG. 9, the presence/absence information block includes a greater number of presence/absence information items than the presence/absence information block shown in FIG. 5. This is because the number of word identification numbers has increased by the number of newly appearing words (e.g., "dog", "small", and "white"). These newly appearing words each are given a presence/absence information item "1" naturally.

Figure 10:
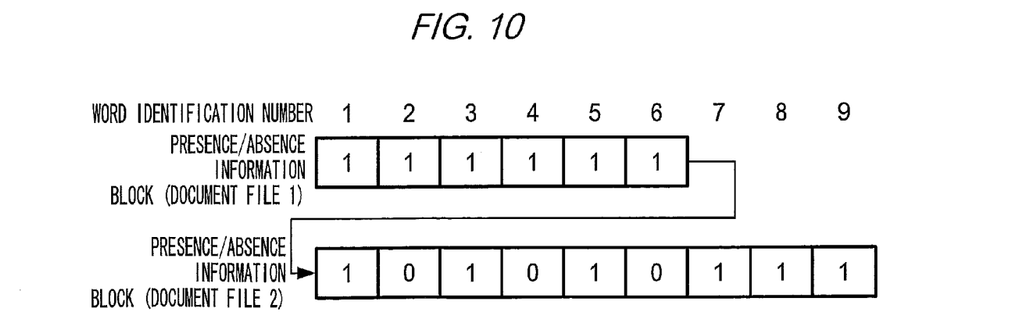
FIG. 10 shows an example of a presence/absence information list.

The controller 21 updates the presence/absence information list by adding the presence/absence information block, which has been newly generated as described above, to the end of the existing presence/absence information list. Specifically, the presence/absence information list updated by the controller 21 is as shown in FIG. 10. In this figure, the presence/absence information blocks are respectively described in different lines, aiming for easy understanding of a boundary between presence/absence information blocks. In actual data, however, there is no need to insert any data indicating a line feed at the line feed position. In the following description, the position indicating a boundary between presence/absence information blocks will be referred to as a "boundary position", for convenience of explanation.

Figure 11:
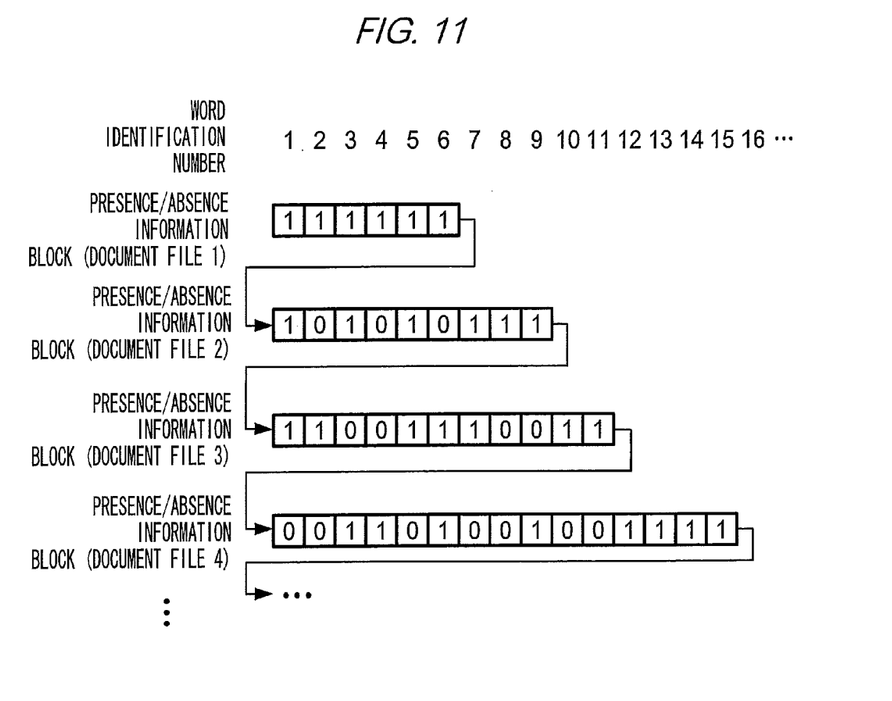
FIG. 11 also shows an example of a presence/absence information list.

FIG. 11 shows an example of a presence/absence information list in a case where the presence/absence information list is updated repeatedly as described above. As described above, the presence/absence information list is data in which presence/absence information blocks associated respectively with document files are arranged in an order dependent on file identification numbers. In each of the presence/absence information blocks, presence/absence information items are all arranged in an order of word identification numbers.

The controller 21 executes the processing of steps Sa4 to Sa8 on all document files obtained. When there remain no more document files to be processed as a processing target (step Sa9: NO), the controller 21 calculates and generates a partition information item for partitioning the word list (step Sa10). The partition information item indicates boundary positions in the word list. Parts of the word list which are partitioned in accordance with the partition information item will be hereinafter respectively referred to as "partitions". The number of partitions may be an arbitrary number not smaller than 2. The controller 21 stores the calculated partition information item into the storage unit 22.

Figure 12:
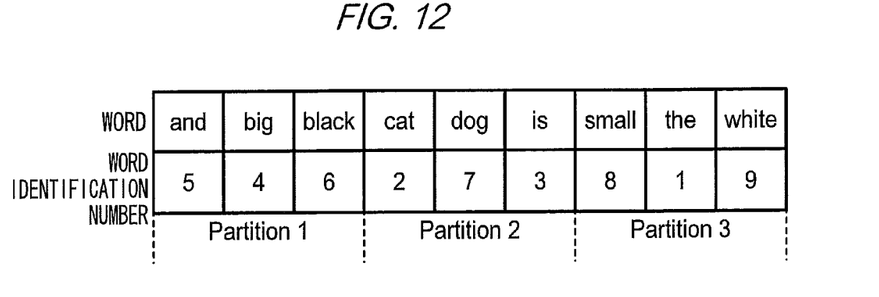
FIG. 12 shows an example of partitions.

FIG. 12 shows an example of partitions. This figure shows a case of using the word list shown in FIG. 8. The partitions each are desirably set up to include a substantially equal number of words.

Figure 13:
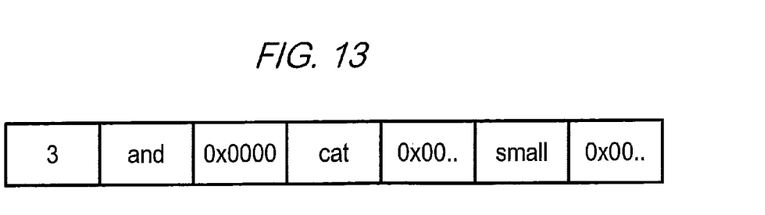
FIG. 13 shows an example of a data format of a partition information item.

FIG. 13 shows a data format of the partition information item. As shown in this figure, the partition information item describes the number of partitions, words located respectively at heads of the partitions, and location addresses of the words. For example, in case of setting up partitions as shown in FIG. 12, the number of partitions is "3". The first word in the first partition is "and", and the first word in the second partition is "cat". The first word in the third partition is "small".

Upon completion of data generation as described above, the controller 21 finally generates an index information item (step Sa11). The index information item includes a total number of words included in the word list, and a total number of document files. The index information item may further include a size (data volume) of indices and/or a checksum (for example, according to the known hashing function, MD5). The controller 21 outputs the aforementioned indices via the communication unit 23 and controls the storage unit 12 to store the indices (step Sa12).

Processing executed by the data management device 20 have been described above. In this manner, indices are generated and supplied to the search device 10. If a character string (hereinafter "search character string") is input by a user as a search target (or search key) after the search device 10 obtains the indices, the search device 10 uses the indices supplied from the data management device 20 to search for the character string.

2-2 Search for a Character String

Figure 14:
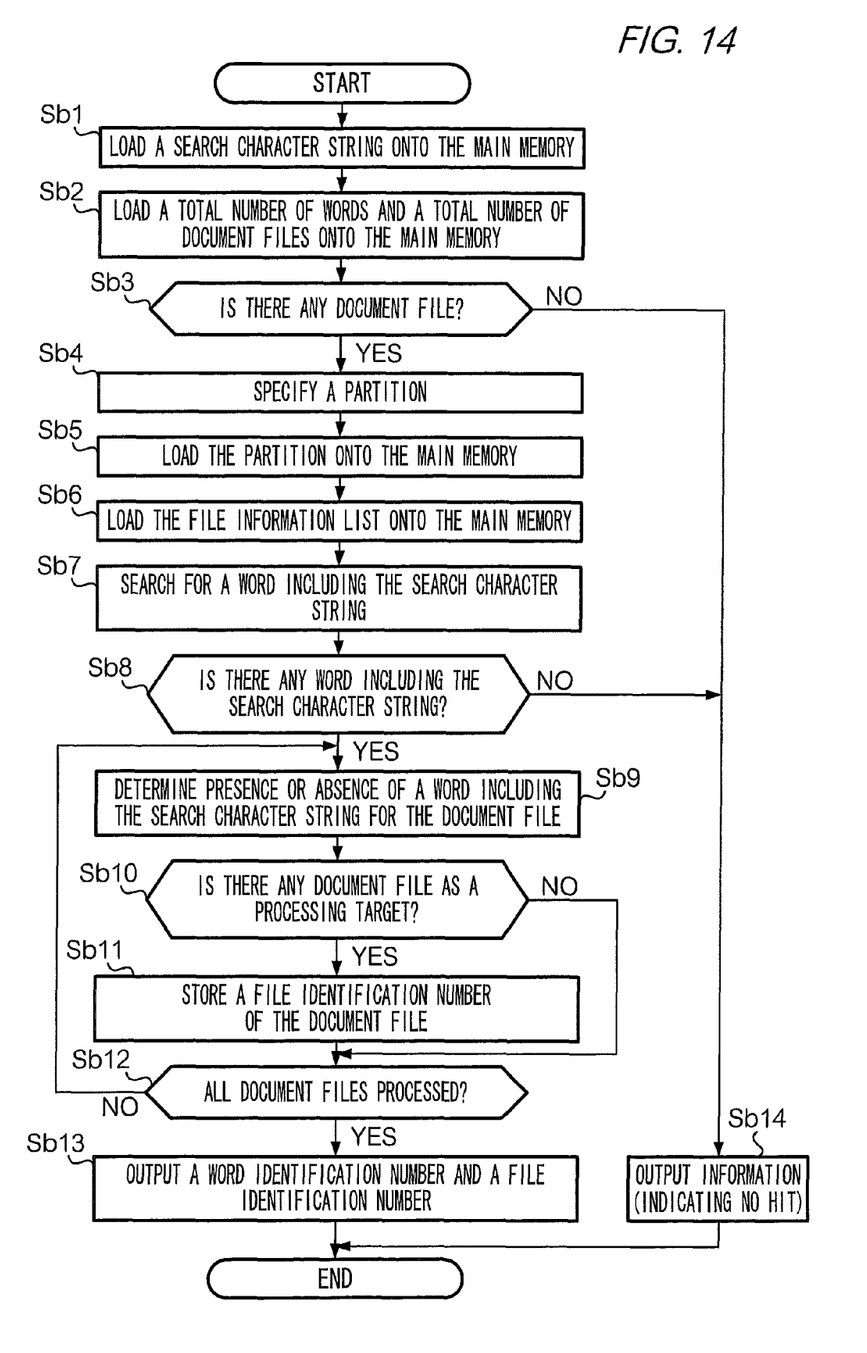
FIG. 14 is a flowchart showing an operation of the search device.
Figure 15:
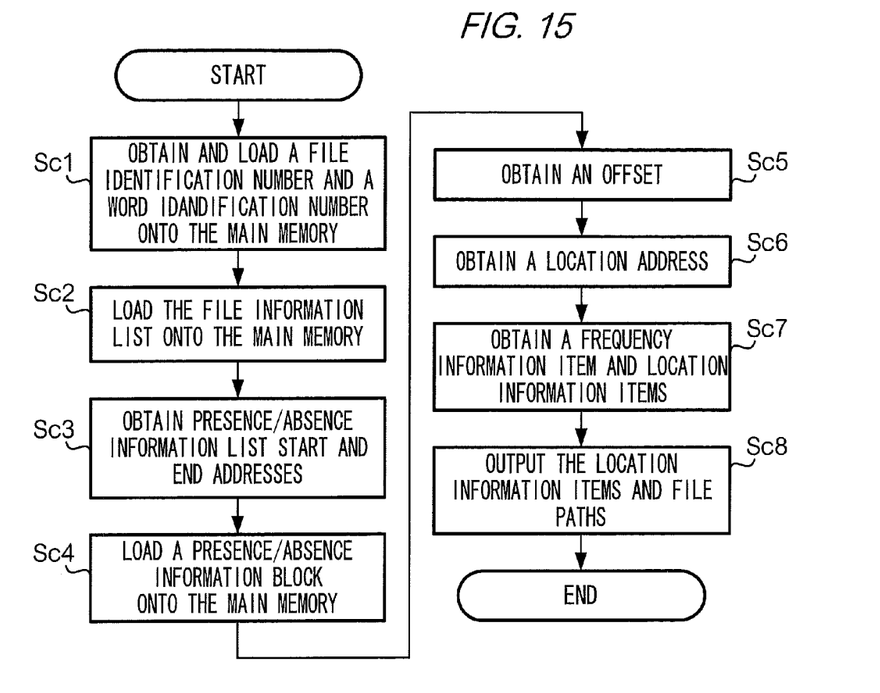
FIG. 15 is also a flowchart showing an operation of the search device.

FIGS. 14 and 15 are flowcharts showing operations of the search device 10. FIG. 14 shows a first search processing for specifying a document file including a search character string. FIG. 15 shows a second search processing for specifying a location of a corresponding word from a specified document file. The search device 10 according to this embodiment performs a search function based on a two-step search processing which consists of the first and second search processing. In this embodiment, the first and second search processing are respectively executed by separate programs. Alternatively, the first and second search processing may be executed by one single program.

As shown in FIG. 14, the controller 11 of the search device 10 obtains a search character string through the input unit 14 and loads the string into the main memory (step Sb1). Subsequently, the controller 11 reads the index information item, and loads a total number of words included in a word list and a total number of document files onto the main memory (step Sb2). The controller 11 further determines whether or not the total number of document files is "0", thereby to ascertain whether or not there is any document file to be processed as a search target (step Sb3). If the total number of document files is "0" at this time (step Sb3: NO), the controller 11 outputs information indicating that no document file is hit by the search (step Sb14), and terminates the search processing. If the controller 11 terminates the search processing after outputting the information indicating absence of an available document file in this way, the controller 11 informs the user of absence of an available document file by showing the information via the display 11 or the like.

Otherwise, if the total number of document files is not "0" (step Sb3: YES), i.e., if a document file as a processing target exists, the controller 11 specifies a partition which may possibly include the search character string, referring to the partition information item (step Sb4). The controller 11 compares words described in the partition information item with letters of the search character string orderly from the first one of the words, thereby to specify which partition may possibly include the search character string. After a partition is specified in this manner, the controller 11 reads and loads only this partition from the word list into the main memory (step Sb5).

Subsequently, the controller 11 reads and loads a file information list into the main memory (step Sb6). Further, the controller 11 searches the partition (which is a part of the word list) loaded in the main memory, for a word including the search character string (step Sb7). The controller 11 carries out this search by a so-called binary search. That is, the controller 11 specifies a word which is positioned in the center of the partition, and determines whether the search character string is included in the first half (a side close to "a") or the last half (a side close to "z") relative to the center of the partition. This operation is repeated to narrow a part of the loaded word list which may include the search character string. In this manner, the controller 11 is capable of specifying whether or not the search character string exists in the partition loaded on the main memory. If a word including the search character string is specified, the controller 11 is then capable of specifying a word identification number associated with the word.

Subsequently, the controller 11 determines whether or not a word including the search character string exists in the partition (step Sb8), from a result of the search as described above. If no word includes the search character string (step Sb8: NO), the controller 11 outputs information indicating absence of an available document file (step Sb14), and terminates the search processing. Otherwise, if there is a word including the search character string (step Sb8: YES), the controller 11 performs a processing for specifying a document file that includes the word by use of the presence/absence information list (steps Sb9 to Sb12). The processing of steps Sb9 to Sb12 is a looped processing which is carried out for each document file.

The controller 11 determines whether or not a word including the search character string exists for each of document files by referring to the presence/absence information list (step Sb9). The controller 11 makes this determination by a mask processing. More specifically, where a file identification number of a document file as a determination target is specified as y and a word identification number of a word including the search character string is specified as x, the controller 11 calculates a mask pattern which extracts only an x-th presence/absence information item counted from a (y−1)-th boundary position from the head of the presence/absence information list. The mask processing may be carried out using the calculated mask pattern.

Next, the controller 11 switches subsequent processing depending on a result of the determination as described above (step Sb10). That is, if a document file as a target includes a word including the search character string (step Sb10: YES), the controller 11 specifies a file identification number of the document file as a target, on the basis of the file information list loaded in the main memory, and stores the specified file identification number into the buffer memory (step Sb11). Otherwise, if the document file as a target does not include a word including the search character string (step Sb10: NO), the controller 11 skips the processing of step Sb11.

After performing the processing of steps Sb9 to Sb12, the controller 11 determines whether or not a document file as a processing target still remains, thereby to ascertain whether or not the processing of steps Sb9 to Sb12 has been executed on all document files (step Sb12). This determination is made depending on whether or not a file identification number of a document file as a processing target is a maximum value (a final value).

If a document file as a processing target still exists (step Sb12: NO), the controller 11 repeats the processing of steps Sb9 to Sb12 for the document file as a new processing target. At this time, the controller 11 deals with, as a new processing target, a document file assigned with a file identification number which is greater by "1" than that assigned to a document file which has been processed immediately before. Otherwise, if there is not any document file as a processing target (step Sb12: YES), the controller 11 terminates the first search processing. At this time, the controller 11 outputs a word identification number of a word including the search character string and one or plural file identification numbers of document files each including the word, as arguments to be taken over by the second search processing (step Sb13). The one or plural file identification numbers which are output at this time are all of the file identification numbers that have been stored into the buffer memory in the step Sb11.

Subsequently, the second search processing will now be described below. If plural file identification numbers are output as a result of the first search processing, the second search processing is repeated a number of times corresponding to the number of the plural file identification numbers. Similarly, if plural word identification numbers are output as a result of the first search processing, the second search processing is repeated a number of times corresponding to the number of the plural word identification numbers.

In the second search processing, the controller 11 firstly obtains the file identification numbers and the word identification numbers, which are output as a result of the first search processing, and loads the numbers onto the main memory (step Sc1). Next, the controller 11 reads and loads the file information list into the main memory (step Sc2). From the file information list, the controller 11 reads and obtains a presence/absence information list start address and a presence/absence information list end address, for a document file specified by a file identification number obtained in the step Sc1. In this manner, the controller 11 is capable of specifying a presence/absence information block for the document file. The controller 11 loads the specified presence/absence information block into the main memory (step Sc4).

Next, the controller 11 specifies the number of presence/absence information items having a value "1" from among presence/absence information items starting from a presence/absence information item at the head of the loaded presence/absence information block up to a presence/absence information item assigned with the word identification number obtained in the step Sc1 (step Sc5). The number specified at this time will be hereinafter referred to as an "offset". The offset is a value indicating in which numbered location address in the location address block a target word is described at (i.e., which is the word assigned with the word identification number obtained in the step Sc1).

Figure 16:
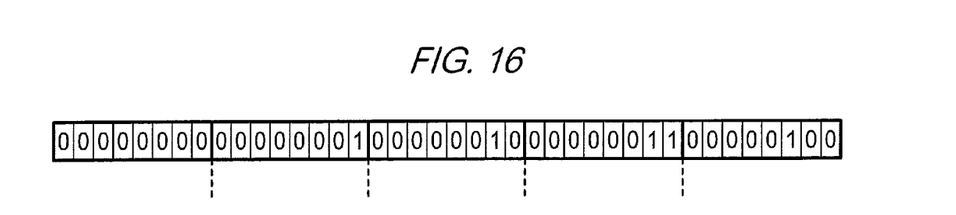
FIG. 16 shows an example of a presence/absence information block.

The processing of the step Sc5 will now be described referring to a specific example. The example will be described on the assumption that a presence/absence information block for a document file is as shown in FIG. 16. In this example, a target word is assigned with a word identification number "38". The controller 11 uses a lookup table shown in FIG. 17 to calculate a total number of "1" existing between the head of the presence/absence information block and the target word. More specifically, the presence/absence information items are divided into groups each consisting of eight digits, from the head of the presence/absence information items. Each of the eight digits is regarded as a binary value and is compared with the lookup table. The lookup table is to output how many instances of "1" are included where a value is input and expressed as a binary value.

Figure 17:
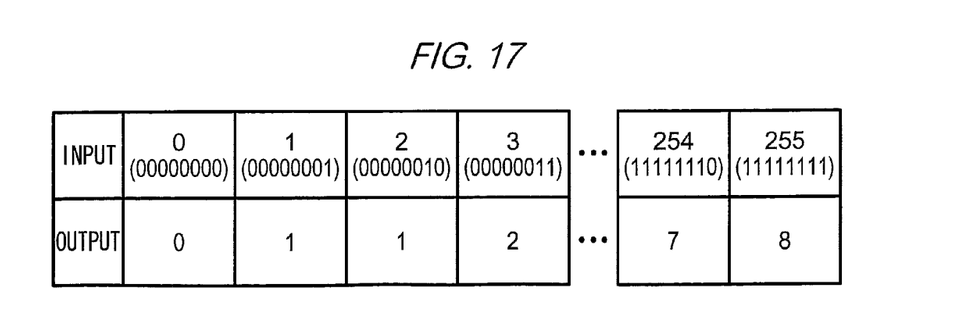
FIG. 17 shows an example of a lookup table.

It is now assumed that the first eight digits of the presence/absence information block are applied as an input value to the lookup table. Since these eight digits do not include "1", an output value "0" is obtained. Subsequently, the next eight digits of the presence/absence information block are applied as an input value to the lookup table. Since these eight digits include one "1" an output value "1" is obtained. In this manner, each of the eight digits is applied to the lookup table sequentially from among the presence/absence information items. When execution of this operation is repeated five times, a target word is then reached. Output values from each of these five operations are respectively "0", "1", "1", "2", and "1", which are added up to give "5". Accordingly, the controller 11 specifies an offset to be "5" in this case. That is, the offset "5" teaches that, where words included in the document file are arranged in an order from a word assigned with the smallest word identification number, the target word corresponds to the fifth "1" in this order.

Returning to FIG. 15, the controller 11 specifies an offset as described above, and then obtains a location address specified by the offset, referring to the location address list (step Sc6). More specifically, the controller 11 specifies a location address block associated with a file identification number obtained in the step Sc1 from the location address list. The controller 11 further obtains a location address at a location which is shifted by an offset from the head of the location address block. That is, in case of the example described with reference to FIGS. 16 and 17, the obtained location address indicates "5" th location address block from the head of the specified location address block.

After obtaining the location address, the controller 11 refers to the location information list, and reads a frequency information item at the location indicated by the location address, and a location information item combined with the frequency information item (step Sc7). Further, the controller 11 outputs the read location information item (and frequency information item), and a file path associated with the file identification number obtained in the step Sc1 (step Sc8), and then terminates the search processing.

The controller 11 controls the display 15 to display a search result by using data which is output as described above. For example, the controller 11 is capable of using the file path and the location information item, to display a document file including the search character string and to allow the user to recognize a specific location of the search character string. Although the user may be enabled to recognize the search character string in any manner, the search character string may be displayed in a different color from other characters or with an underline drawn below, for example.

The controller 11 is also capable of using the file path and the frequency information item to display a document file including the search character string and to display how many times the search character string repeatedly appears in the document file.

3. Effect of the Embodiment

By performing search processing as described above, the search device 10 according to this embodiment can adequately operate even in a structure equipped with limited resources, such as a embedded system. In the search device 10 according to this embodiment, information concerning presence/absence of each word in each of plural document files is stored in only one single file (e.g., the presence/absence information list). Accordingly, the search device 10 achieves data input/output at a higher speed than in a case where information concerning presence/absence of words in plural document files is stored divided in plural files. In addition, the presence/absence information list according to this embodiment expresses presence/absence of each word by using only information of "1" or "0". Data size is thereforekept to a minimum.

The search device 10 according to this embodiment also stores, in only one single file (i.e., one aggregate), each of the location information list and the location address list in addition to the presence/absence information list. Thus, the search device 10 is characterized by performing processes without the need for any link structure. The search device 10 according to this embodiment achieves file access at a higher speed by collecting together a group of data sets which have a common function, into one single file, as described above.

The search device 10 according to this embodiment still stores various addresses in the index information item. Therefore, access to a document file as a target is facilitated even when presence/absence information items and location information items are stored in one single file.

In the search device 10 according to this embodiment, words are respectively assigned with word identification numbers, and the word list describes correspondence between the words and the word identification numbers. Accordingly, the presence/absence information list can be described in an order dependent on the word identification numbers. The word identification numbers are consecutively assigned in an order from words included in a document file which includes the smallest number of words. Therefore, the search device 10 according to this embodiment configured as described above reduces the number of presence/absence information items to be smaller than a product of a maximum value of word identification numbers and a maximum value of file identification numbers (FIG. 11).

To specify a location address of a target word, the search device 10 according to this embodiment uses a lookup table as shown in FIG. 17. Accordingly, any location address can be specified at a higher speed, for example, than in a case of counting presence/absence information items from the head of a presence/absence information block. Such specification of a location address is achieved because the presence/absence information list is described as data consisting only of "1" and "0".

The search device 10 according to this embodiment achieves a reduction in data volume of the word list to be read out, by employing partitions which divide the word list. As a result, data is read at a higher speed, and the number of words that are searched for a search target is reduced. The word list which is arranged in lexicographic order enables definition of such partitions.

Further, the search device 10 according to this embodiment stores location information items and frequency information items in only one single file (e.g., the location information list). Accordingly, the search device 10 reads data at a higher speed than in a case of storing the location information items and frequency information items into separate files. For example, when a word including a search character string repeatedly appears in one document file, positions where the word repeatedly appears can be specified at a high speed.

Figure 18A:
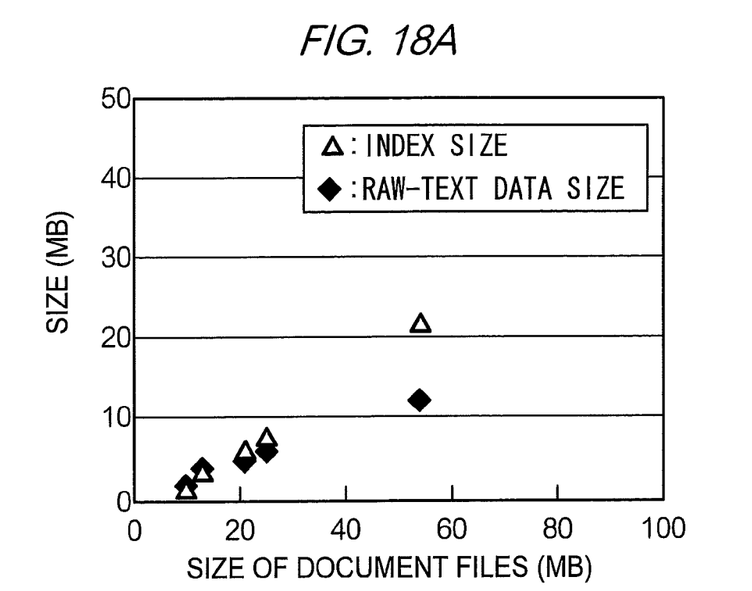
FIG. 18 explain effects of the embodiment (Δ: indicates index size, ♦: indicates raw-text data size)
Figure 18B:
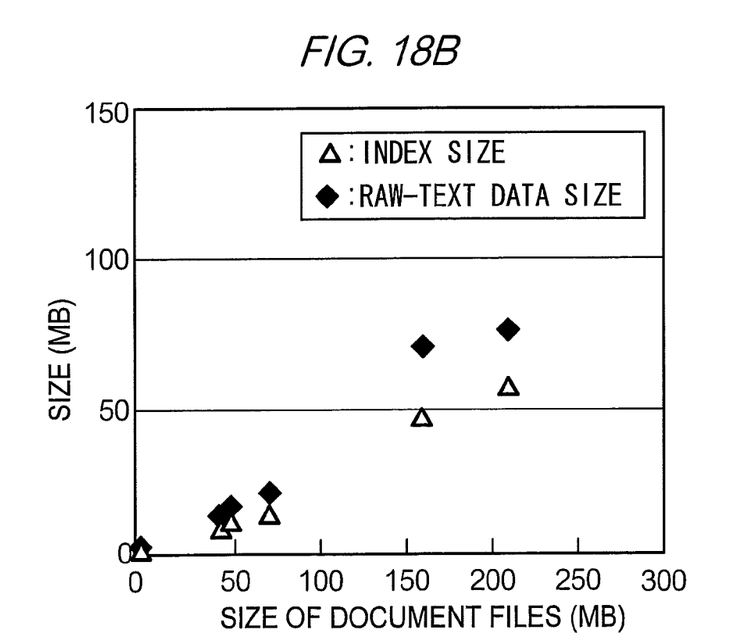

FIG. 18 are to explain effects of this embodiment. FIG. 18A shows sizes of indices and text files (where document files are converted into a text format), compared with a size (total data volume) of document files. FIG. 18A shows a case of using the presence/absence information list according to this embodiment. FIG. 18B shows a case of not using the presence/absence information list. In the latter case of not using the presence/absence information list, presence/absence of each word is indicated by a location address in place of using the presence/absence information list. Predetermined data (e.g., data whose values are all "1") having the same data length as each location address is used as data indicating absence of a word. Document files used are PDF (Portable Document Format) files.

As shown in FIG. 18, in the case of using the presence/absence information list according to this embodiment, the size of indices (denoted by triangular plots) was reduced to be smaller than the size of text files (denoted by rectangular plots). In particular, this effect has been found to be more effective as the size of document files increases.

According to experiments conducted by the present inventor, processing time (actual time) was compared between the search function of this embodiment and a grep command based on UNIX (registered trademark). The grep command required approximately 14 seconds while the search function of this embodiment required only approximately 0.46 seconds. As a result, the search function according to this embodiment has been found to be capable of performing a search at a satisfactorily high speed in practical use.

The search function according to this embodiment is more outstanding when disk caching is available than when disk caching is unavailable.

4. Modifications

The invention is not limited to the embodiment described above, but may be modified into other various forms in practical use. For example, the partition information item and the file information list are not indispensable. Needless to say, however, processing may be performed at a higher speed by limiting a range of data to read out with use of the partition information item or the file information list. Further, the binary search used to perform a word search in the above embodiment may be left unused.

If the file information list is not provided, positions which indicate boundaries between presence/absence information blocks are difficult to specify. In this case, any data indicting a boundary position may be inserted between presence/absence information blocks, for example. Data to be inserted in this way may be of any type so long as the data indicates content other than "1" and "0", which in this case "1" and "0" are limited to multi-bit representations instead of single bit Alternatively, presence/absence information blocks each may be configured to include an equal number of presence/absence information items. In this case, the number of presence/absence information items is equal to a maximum value of word identification numbers for all presence/absence information blocks. By configuring the presence/absence information blocks to have an equal data size in this manner, boundary positions are specified easily.

The invention is further applicable to an AND search, an OR search, and a NOT search. The above embodiment has been described referring to a case that a search character string is included in one word. However, the invention is also applicable to a so-called phrase search.

If the invention is applied to a phrase search, narrowing may be carried out based on an order of words in the phrase as a search character string after an AND search is executed. Alternatively, phrases may be described in the word list. For example, when "thank" and "you" are already listed as words in the word list, a phrase of "thank you" may be added as one single word. In brief, the "word list" in the above embodiment refers to a list of words each of which appears at least one time in a document file. The "word list" then may be a list of words and/or phrases each of which appears at least one time in a document file.

Also in the above embodiment, the invention is exemplarily applied to a display device. However, the search device according to the invention is also applicable to various other devices than the display device. Although the invention has a configuration which is suitably used in a embedded system having limited resources, the invention may be applied to other devices which have a relatively large amount of resources. In this case, a search for a character string and generation of indices may be carried out by one single device.

The above embodiment is based on a prerequisite that files as search targets (e.g., document files in the embodiment) are displayed. Files as search targets do not necessarily need to be displayed. In this case, files may include a character string which is not displayed as a word. For example, meta data can be included as a word in files.

Depending on searches, there can be a case that only files including a search character string need to be specified, and locations of words including the search character string need not be specified in the specified files. In this case, only information which can specify files, such as file paths as described previously, need to be output. Also in this case, neither a configuration for storing location information items nor a configuration for specifying location information items is required.

Also in the above embodiment, data exchange between the search device 10 and the data management device 20 is achieved by communication through the communication units 13 and 23. However, ways of obtaining or supplying data are not particularly limited so long as data can be exchanged between the search device 10 and the data management device 20. For example, the storage unit 12 may be configured in a detachable/attachable structure like a memory card, and the data management device 20 may be configured to be capable of reading and writing data from/into the storage unit 12.

In the above embodiment, the programs executed by the controller 11 may be provided, stored in a computer-readable recording medium such as a magnetic recording medium (e.g., a magnetic tape, a magnetic disk, a HDD (Hard Disk Drive), or an FD (Flexible Disk)), an optical recording medium (e.g., an optical disk, a CD (Compact Disk), or a DVD (Digital Versatile Disk)), a magneto-optical recording medium, or a semiconductor memory (flash ROM). Alternatively, the program may be downloaded via a network such as the Internet.

What is claimed is:

1. A search device comprising:
    a storage unit storing
        a plurality of file information items that respectively identify a plurality of files, the plurality of files each including one or more character strings,
        a character string list that includes one or more character strings and one or more identification numbers, the one or more character strings being included in at least one of the plurality of files, and the one or more identification numbers respectively uniquely specifying the one or more character strings, and
        a presence/absence information list that includes presence/absence information blocks respectively for the plurality of files, the presence/absence information blocks each expressing one or more presence/absence information items which respectively indicate presence or absence relative to the one or more character strings included in the character string list, and the one or more presence/absence information items being arranged in an order dependent on the one or more identification numbers;
    an obtaining unit that obtains a search character string as a search target to be searched for;
    an identification number specification unit that, when a character string including the search character string obtained by the obtaining unit is included in the character string list, specifies an identification number uniquely specifying the character string from the character string list;
    a file specification unit that specifies a file including the character string uniquely specified by the identification number specified by the identification number specification unit, in accordance with the one or more presence/absence information items in the presence/absence information list; and
    an output unit that outputs one of the plurality of file information items which indicates the file specified by the file specification unit.

2. The search device according to claim 1, wherein
    the storage unit is configured to store a plurality of location information items which respectively indicate locations of one or more character strings included in the at least one of the plurality of files, and
    the search device further comprises a location information specification unit that specifies a location information item indicating a location of the character string including the search character string in the file specified by the file specification unit, and
    the output unit is configured to output the file information item specifying the file specified by the file specification unit, and the location information item which is specified for the specified file by the location information specification unit.

3. The search device according to claim 1, wherein
    the storage unit is configured to store a partition information item that divides the character string list into a plurality of parts,
    the identification number specification unit includes
        a partition specification unit that specifies which one of the plurality of parts divided by the partition information includes the character string including the search character string, which is obtained by the obtaining unit, and
        a determination unit that determines whether the one of the plurality of parts, which is specified by the partition specification unit, includes the character string including the search character string or not,
    and
    if the one of the plurality of parts, which is specified by the partition specification unit, includes the character string including the search character string, the identification number specification unit is configured to specify an identification number uniquely specifying the character string.

4. The search device according to claim 1, wherein
the identification number specification unit includes a search unit that searches, by a binary search, the character string list for a character string including the search character string obtained by the obtaining unit.

5. The search device according to claim 1, wherein
the one or more presence/absence information items respectively express presence or absence of the one or more character strings included in the character string list, so that the presence or absence of each of the one or more character strings is expressed by one bit.

6. The search device according to claim 1, wherein
the one or more identification numbers are assigned to the one or more character strings in an order from one or more character strings included in one of the plurality of files which includes a smallest number of character strings, and
the smaller a total number of character strings which one of the files includes so as to appear at least one time in the one of the files is, the smaller a number of the presence/absence information items included in one of the presence/absence information blocks for the one of the file is.

7. The search device according to claim 1, wherein
the storage unit is configured to store address information items which indicate the presence/absence information blocks for the plurality of files, respectively, and
the file specification unit is configured to specify respectively individuals of the presence/absence information blocks based on the address information items, and specifies one of the plurality of files which includes the character string uniquely specified by the identification number specified by the identification number specification unit, from the presence/absence information blocks.

8. A computer readable recording medium storing a program causing a computer to execute a process, the process comprising:
obtaining
a plurality of file information items that respectively identify a plurality of files, the plurality of files each including one or more character strings,
a character string list that includes one or more character strings and one or more identification numbers, the one or more character strings being included in at least one of the plurality of files, and the one or more identification numbers respectively uniquely specifying the one or more character strings,
a presence/absence information list that includes presence/absence information blocks respectively for the plurality of files, the presence/absence information blocks each expressing one or more presence/absence information items which respectively indicate presence or absence for the one or more character strings included in the character string list, and the one or more presence/absence information items being arranged in an order dependent on the one or more identification numbers, and
a search character string as a search target to be searched for;
specifying, when a character string including the obtained search character string is included in the character string list, an identification number uniquely specifying the character string from the character string list;
specifying a file including the character string uniquely specified by the specified identification number, in accordance with the one or more presence/absence information items in the presence/absence information list; and
outputting one of the plurality of file information items which indicates the specified file.

* * * * *